United States Patent Office

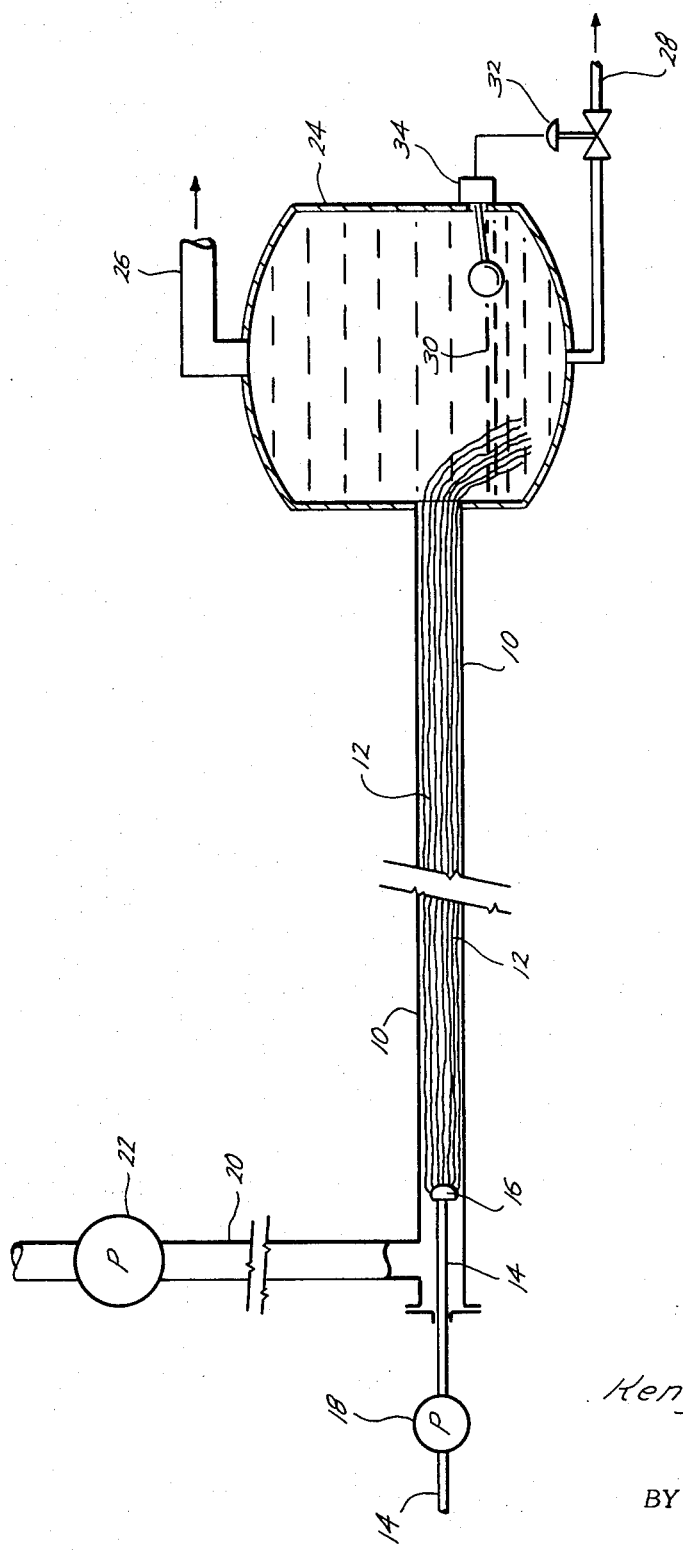

3,758,404
Patented Sept. 11, 1973

3,758,404
LIQUID-LIQUID MASS TRANSFER PROCESS AND APPARATUS
Kenyon E. Clonts, Houston, Tex., assignor to Merichem Company, Houston, Tex.
Filed July 9, 1971, Ser. No. 161,068
Int. Cl. C10g 17/00
U.S. Cl. 208—263     4 Claims

ABSTRACT OF THE DISCLOSURE

A component of at least one of two immiscible liquids is transferred into the other liquid by introducing one of the liquids (the "first liquid") onto the surface of fibers extending generally linearly along a conduit with the fibers filling the cross-sectional area of at least a portion of the length of the conduit and being wetted preferentially by the first liquid, flowing the other liquid (the "second liquid") through the conduit past the fibers thereby dragging a film of the first liquid along the fibers, collecting the liquids in a gravity separator approximate the downstream end of the fibers and then separately removing the two liquids from the separator.

BACKGROUND OF THE INVENTION

The field of art to which the invention pertains is liquid-liquid mass transfer between immiscible liquids, for example the removal of acidic compounds carried in a hydrocarbon by contacting the hydrocarbon with an aqueous solution of caustic.

One conventional way to transfer a component of one immiscible liquid into another is the dispersion-settling process in which one liquid is dispersed into the other to form an emulsion and then the emulsion is allowed to settle and separate. One situation in which this dispersion-settling process is used is in the separation of acidic constituents from cracked gasoline. This gasoline is treated with an aqueous caustic solution, which is immiscible in the gasoline, to remove the acidic matter. Conventionally, this treatment consists of dispersing the aqueous caustic solution in the gasoline to form a caustic-in-gasoline emulsion. The acidic constituents in the hydrocarbon phase present at the interfacial boundary between the droplets of aqueous caustic and the surrounding hydrocarbon phase will react with the caustic to form sodium salts. These salts greatly favor the aqueous caustic solution and will enter the aqueous phase and diffusively migrate into the droplets away from the interfacial boundary. After a sufficient time has passed for the acidic constituents to move from the hydrocarbons into the aqueous caustic, the emulsion of hydrocarbon and caustic is placed in a settling tank and the caustic allowed to settle to the bottom.

The efficiency of the mass transfer of the acidic constituents for a given volume of aqueous caustic is improved by (a) increasing the interfacial boundary and (b) decreasing the distance through the hydrocarbon phase that the acidic constituents must diffuse to reach this boundary. This can be accomplished by making the droplets very small, but this inreases the energy requirements to create the emulsion. Also, when the droplets are made smaller, the time for them to settle in the settling tank is increased.

Another type of liquid-liquid mass transfer is described in U.S. Pat. No. 3,351,434 issued Nov. 7, 1967, to P. G. Grimes, et al., for a "Liquid-Liquid Two-Phase Contactor" in which discs are rotated by a motor between two immiscible liquid layers to extract a component from one liquid into the other. Such a system reduces considerably the problems of emulsion settling, but it is still not entirely satisfactory.

The present development creates a large interfacial boundary with very low energy requirements and eliminates the need of waiting for an emulsion to separate.

SUMMARY OF THE INVENTION

It is a general object of the present invention to provide a process and apparatus for liquid-liquid mass transfer which eliminates the high energy needs sometimes required to create emulsions and the problems of separating the constituents of the emulsion.

Another general object is to provide such a process in which a component of one of two immiscible liquids is transferred to the other through a liquid film on fibers which liquid film is dragged along the fibers by a flow of another liquid.

Other and further objects, features and advantages will be apparent from the following description of the present invention given for the purpose of disclosure.

The present invention is based upon the discovery that excellent results are obtained in transferring a component of one liquid to another between the first and second immiscible liquids by (a) introducing the first liquid onto an upstream surface portion of a plurality of fibers extending generally along and secured in a conduit, the fibers filling the cross-sectional area of at least a portion of the length of the conduit and being wetted by the first liquid preferentially to the second liquid, (b) flowing the second liquid throuhg the conduit and past the fibers in a direction from the upstream portion of the fibers toward a downstream end of the fibers thereby dragging a film of the first liquid along the fibers, (c) collecting the liquid leaving the downstream end of the fibers in a gravity separator approximate the downstream end of the fibers, and (d) separately removing the two liquids from the separator.

With the fibers being preferentially wetted by the first liquid (sometimes herein called "the constrained phase"), the movement of the second liquid (sometimes herein called "the continuous phase") through the conduit will cause the first liquid to form a film on the fibers and then move the film in a downstream direction in the conduit. Because the liquid film on a fiber will completely surround the fiber, this film is held to that fiber by both the wetting action (adhesion) and the surface tension around the curvature of the fiber. This reduces considerably the tendency of the liquid film to come free from the fiber and be dispersed in the continuous phase when compared to what occurs with a film on a flat surface such as a disc.

As the film of the constrained phase is dragged downstream along the fibers by the continuous phase, the interface between the two liquids is constantly changed, thereby increasing the rate of transfer of a component between the two liquids.

A gravity separator is placed approximate the downstream end of the fibers so that the liquid film passes from the fibers immediately into the gravity separator and is collected prior to it becoming dispersed in the continuous phase.

The component that is transferred between the liquids may be transferred either into or out of the liquid film on the fibers. The transfer may be the result of a chemical reaction at the interface such as the removal of acidic constituents of a hydrocarbon by reaction with a base in an aqueous solution or the transfer may be without a chemical reaction, such as by absorption from one liquid to another.

The fiber should be a material which will not contaminate the process or be destroyed by it, such as by corrosion. Glass fibers are presently preferred for most applications. However, in applications in which the constrained phase is an aqueous solution of sodium hydroxide and the continuous phase is gasoline containing acidic constituents, steel fibers are preferred over glass fibers because the latter will be chemically attacked.

BRIEF DESCRIPTION OF THE DRAWING

The drawing is a schematic illustration of a presently preferred apparatus which can be used with the process of the present invention.

DESCRIPTION OF THE PREFERRED EMBODIMENT

Referring to the drawing, a conduit 10 has in it a bundle of elongate glass fibers 12 filling the conduit 10 for a portion of its length. These glass fibers 12 are secured to a tube 14 at a perforated node 16. The tube 14 extends beyond one end of the conduit 10 and has in it a metering pump 18 which pumps the first liquid through the tube 14 and onto the fibers 12.

Connecting with the conduit 10 upstream of the node 16 is an inlet pipe 20 having in it a metering pump 22. This pump 22 supplies the second liquid through the inlet pipe 20 and into the conduit 10.

At the downstream end of the conduit 10 is a gravity separator or settling tank 24 into which the downstream end of the fibers 12 extend. In an upper portion of the gravity separator 24 is an outlet 26 for one of the liquids and at a lower portion an outlet 28 for the other liquid with the level of the interface 30 between the two liquids being controlled by a valve 32 in an outlet line 28 acting in response to a liquid level controller indicated generally by the numeral 34.

In operation of the apparatus of this drawing, liquid, such as a caustic aqueous solution, is introduced through the tube 14 and onto the fibers 12. Another liquid, such as gasoline containing acidic constituents, is introduced into the conduit 10 through the inlet pipe 20. The fibers 12 will be wetted by the aqueous caustic solution preferentially to the gasoline mixture. The aqueous caustic solution will form a film on the fibers 12 which will be dragged downstream through the conduit 10 by the passage of gasoline mixture through the same conduit. Both liquids will be discharged into the separator 24 but with the volume of the gasoline being greater because the aqueous caustic will move at a slower velocity than the gasoline. During the relative movement of the gasoline with respect to the aqueous caustic film on the fibers, a new interfacial boundary between the gasoline and the aqueous caustic solution is continuously being formed, and as a result fresh aqueous caustic solution is brought in contact with this surface and allowed to react with the acidic content of the gasoline.

In the separator 24, the aqueous caustic solution will collect in the lower portion as it is heavier than the gasoline. The interface 30 within the separator 24 is normally kept at a level above the bottom of the downstream end of the fibers 12 so that the aqueous caustic film can be collected directly in the bottom of the separator without it being dispersed into the gasoline.

Set forth hereafter are various examples illustrating the process of the present invention.

EXAMPLE 1

Numerous tests were run with approximately 96,000 glass fibers 12 inches in length in a ¼-inch I.D. glass tube. Two liquids were moved to this tube with the constrained phase being the reaction products of a 30% by weight sodium hydroxide aqueous solution and sufficient cresylic acid to react with half of the sodium hydroxide. The continuous phase was a mixture of heptane isomers containing about 0.1% phenol. The glass fibers were wetted by the caustic solution preferentially to the heptane.

The caustic solution was introduced onto the upstream end of the glass fibers at various rates between 15 and 60 ml. per hour. The heptanes were introduced into the conduit and flowed past the fibers at rates varying between about 210 and 3540 ml. per hour. After passing through the glass tubing, the heptanes were analyzed for phenol content and the results showed the following percent phenol recovery.

| Run number: | Heptane rate ml./hr. | Caustic rate, ml./hr. | Heptane to caustic ratio | Percent phenol recovery |
|---|---|---|---|---|
| 1 | 960 | 15 | 64 | 95.7 |
| 2 | 1,390 | 15 | 92 | 94.7 |
| 3 | 1,860 | 15 | 124 | 92.9 |
| 4 | 2,460 | 15 | 164 | 87.9 |
| 5 | 3,220 | 15 | 215 | 77.3 |
| 6 | 210 | 30 | 7 | 98.45 |
| 7 | 330 | 30 | 11 | 99.09 |
| 8 | 950 | 30 | 31.6 | 96.60 |
| 9 | 480 | 30 | 16 | 98.08 |
| 10 | 2,010 | 30 | 67 | 88.2 |
| 11 | 1,290 | 30 | 43 | 92.2 |
| 12 | 2,480 | 30 | 82 | 82.2 |
| 13 | 3,540 | 30 | 116 | 79.4 |
| 14 | 2,940 | 30 | 98 | 82.7 |
| 15 | 1,830 | 60 | 30.5 | 90.1 |
| 16 | 1,800 | 40 | 45 | 92.8 |
| 17 | 1,800 | 20 | 90 | 90.8 |
| 18 | 1,200 | 10 | 120 | 90.7 |

These recoveries are considerably higher than the recovery performances known to applicant for similar phase ratios in the dispersion-settling process described earlier herein. Additionally, contamination of gasoline by sodium ions is much less in the present process than in the dispersion-settling process.

EXAMPLE 2

This was similar to Example 1 except that the fibers were approximately 6,700 steel fibers. Excellent percentages of phenol recovery were obtained here also.

EXAMPLE 3

This example shows an alkylation by transfer of an acid, which may be either $H_2SO_4$ or HF in excess of 90% concentration, into a mixture of saturated and unsaturated aliphatic hydrocarbons. In this example, the conduit was a 0.3-inch I.D. stainless steel tube containing approximately 160,000 strands of glass fiber 12 inches long. The continuous phase was a 12 to 1 solution of isopentane to isopentene and the constrained phase was 98% $H_2SO_4$. Because of the heat generated by the alkylation reaction, both the hydrocarbon feed and the tube were cooled by 0° C. aqueous glycol solution so that the average temperature in the tube during the alkylation reaction was about 11° C. The continuous phase flowed past the fibers carrying with it the film of the constrained phase at various rates to give the following alkylation results.

| Hydrocarbon flow, ml./hr. | Acid flow, ml./hr. | Approx. percent conversion of pentene |
|---|---|---|
| 600 | 20 | 98±15 |
| 780 | 20 | 82±12 |
| 1,200 | 20 | 78±10 |
| 1,800 | 20 | 63±9 |
| 3,000 | 20 | 50±5 |

During alkylation, both of the aliphatic hydrocarbons in the continuous phase diffuse through the interface into the acid film where they react with each other and then the reaction products diffuse back into the continuous phase.

EXAMPLE 4

In this example, diethylamine was removed from toluene by contact with aqueous $H_2SO_4$. The apparatus was similar to that used in Example 1 except that the glass fibers were 6 inches long rather than 12 inches long. The constrained phase was a 6% aqueous $H_2SO_4$ solution. The continuous phase was technical-grade toluene containing about 1,3000 p.p.m. reagent-grade diethylamine. These liquids were flowed through the conduit at various rates of flow and phase ratios with the following results:

| Toluene flow rate, ml./hr. | Acid flow rate, ml./hr. | Ratio of toluene to acid | Percent DEA removed |
|---|---|---|---|
| 1,770 | 30 | 59 | 78.6 |
| 1,140 | 30 | 38 | 90.3 |
| 720 | 30 | 24 | 91.5 |

From the foregoing discussions, examples and description of the invention, it is apparent that the objects set forth herein as well as others have been achieved. Those skilled in the art will recognize that the principles of this invention may be applied in several ways, only a few of which have been exemplified herein specifically. Accordingly, the invention is to be limited only by the spirit thereof and the scope of the appended claims.

What is claimed is:

1. In a process for transferring a component of one liquid to another between contacting first and second immiscible liquids, the improvement comprising:
    (a) introducing the first liquid onto an upstream surface portion of a plurality of fibers extending generally linearly along and secured in a conduit, the fibers filling the cross-sectional area of at least a portion of the conduit's length and being wetted by the first liquid preferentially to being wetted by the second liquid,
    (b) flowing the second liquid through the conduit and past the fibers in a direction from the upstream portion of the fibers toward a downstream end of the fibers thereby dragging a film of the first liquid along the fibers and transferring said component between said liquids,
    (c) collecting the first liquid leaving the downstream end of the fibers in a gravity separator approximate the downstream end of the fibers, and
    (d) separately removing the two liquids from the gravity separator.

2. The process of claim 1 in which the fibers are selected from the group consisting of glass fibers and steel fibers.

3. The process of claim 1 in which the first liquid includes a base in aqueous solution and the second liquid includes a liquid hydrocarbon with an acidic component.

4. The process of claim 2 in which the first liquid includes a base in aqueous solution and the second liquid includes a liquid hydrocarbon with an acidic component.

References Cited
UNITED STATES PATENTS

| | | | |
|---|---|---|---|
| 3,617,531 | 11/1971 | Schlicht | 208—263 |
| 2,605,212 | 7/1952 | Lobban | 208—263 |
| 2,701,783 | 2/1955 | Long et al. | 208—263 |
| 3,351,434 | 1/1967 | Grimes et al. | 23—310 |

FOREIGN PATENTS

| | | | |
|---|---|---|---|
| 618,045 | 4/1961 | Canada | 208—263 |

DELBERT E. GANTZ, Primary Examiner

J. M. NELSON, Assistant Examiner

U.S. Cl. X.R.

210—41